United States Patent [19]
Ushioda et al.

[11] Patent Number: 5,305,426
[45] Date of Patent: Apr. 19, 1994

[54] PLANT OPERATION SUPPORT SYSTEM FOR DIAGNOSING MALFUNCTION OF PLANT

[75] Inventors: Fujiko Ushioda, Tokorozawa; Toshiko Adachi, Niiza; Kazushi Yamamoto, Tokyo, all of Japan

[73] Assignee: Kabushiki Kaisha Toshiba, Kanagawa, Japan

[21] Appl. No.: 883,040

[22] Filed: May 14, 1992

[30] Foreign Application Priority Data

May 15, 1991 [JP] Japan .................. 3-110015
May 12, 1992 [JP] Japan .................. 4-118966

[51] Int. Cl.$^5$ .................. G06F 15/20; G21D 1/00; G05B 23/02
[52] U.S. Cl. .................. 395/61; 395/914; 395/915
[58] Field of Search .................. 395/61, 914, 915

[56] References Cited

U.S. PATENT DOCUMENTS

| | | | |
|---|---|---|---|
| 4,642,782 | 2/1987 | Kemper et al. | 395/61 |
| 4,644,479 | 2/1987 | Kemper et al. | 395/61 |
| 4,649,515 | 5/1987 | Thompson et al. | 395/61 |
| 4,658,370 | 4/1987 | Erman et al. | 395/61 |
| 4,698,756 | 10/1987 | Gonzalez et al. | 395/61 |
| 4,839,823 | 6/1989 | Matsumoto | 395/61 |
| 5,133,046 | 7/1992 | Kaplan | 395/61 |

FOREIGN PATENT DOCUMENTS

| | | |
|---|---|---|
| 63-296108 | 12/1988 | Japan . |
| 1-265311 | 10/1989 | Japan . |
| 1-267799 | 10/1989 | Japan . |
| 2-12408 | 1/1990 | Japan . |

OTHER PUBLICATIONS

Equipment Diagnostic And Operational Support Expert System For Thermal Power Plants, A. Kaji et al., The Hitachi Hyron, vol. 71, No. 8, Aug. 1989, pp. 53-58.

*Primary Examiner*—Allen R. MacDonald
*Attorney, Agent, or Firm*—Finnegan, Henderson Farabow, Garrett & Dunner

[57] ABSTRACT

In response to an alarm, an inference engine in a plant operation support system calculates reliabilities of the appearance of phenomenons based on process data from the plant and a knowledge data base. The knowledge data base refers to diagnosis information and a fault tree. The value obtained from the calculation is compared with a threshold value inherent to each phenomenon. If the calculated value is larger than the threshold value, it is determined that the phenomenon has appeared. The appeared phenomenons are successively displayed on the screen of a display unit in order starting from the alarm phenomenon down to the subordinate phenomenons. An operation guidance corresponding to the displayed phenomenon is retrieved from a guidance data base and is displayed on the display unit.

12 Claims, 10 Drawing Sheets

FIG. 6

| MESSAGE ID NUMBER 1 | GUIDANCE MESSAGE 1 |
|---|---|
| MESSAGE ID NUMBER 2 | GUIDANCE MESSAGE 2 |
| MESSAGE ID NUMBER 3 | GUIDANCE MESSAGE 3 |
| MESSAGE ID NUMBER 4 | GUIDANCE MESSAGE 4 |
| MESSAGE ID NUMBER 5 | GUIDANCE MESSAGE 5 |
| MESSAGE ID NUMBER 6 | GUIDANCE MESSAGE 6 |
| | |
| | |

FIG. 8

| NAME OF PHENOMENON 1 | MESSAGE ID NUMBER 1 |
|---|---|
| NAME OF PHENOMENON 2 | MESSAGE ID NUMBER 2 |
| NAME OF PHENOMENON 4 | MESSAGE ID NUMBER 6 |
| NAME OF PHENOMENON 8 | MESSAGE ID NUMBER 3 |
| NAME OF PHENOMENON 5 | MESSAGE ID NUMBER 2 |
| NULL | |
| | |
| | |

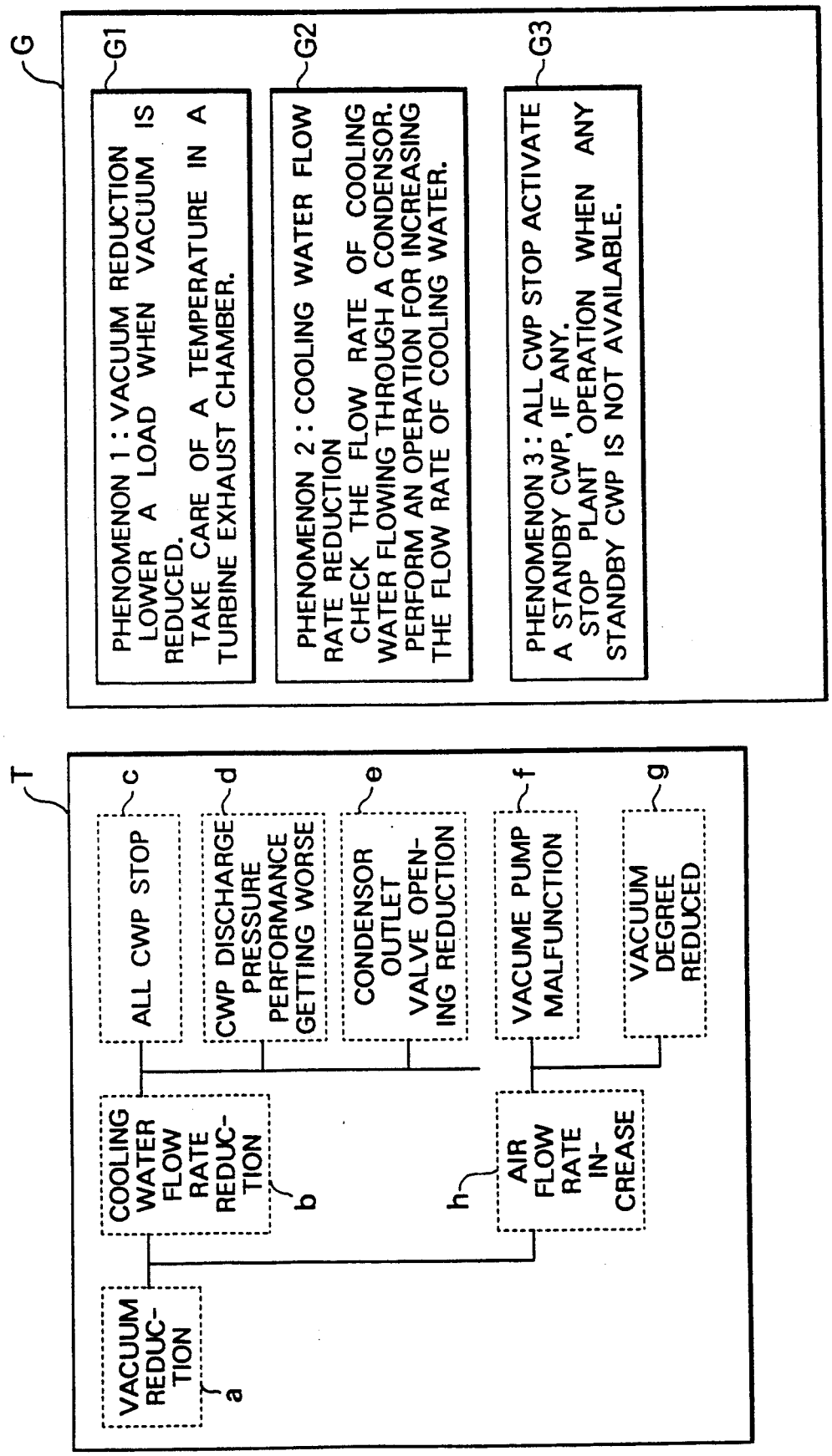

PLANT OPERATION SUPPORT SYSTEM FOR DIAGNOSING MALFUNCTION OF PLANT

BACKGROUND OF THE INVENTION

The present invention relates to a plant operation support system for finding causes of malfunctions in a plant using process data and instructing appropriate operation guides.

As each plant enlarges its capacity and becomes complicated in structure, it becomes increasingly important that operational reliability of the plant is improved. When a malfunction occurs in the plant, it is necessary that the operative state of the plant at this time is correctly assessed so that an adequate remedial operation is performed corresponding to the present state of the plant.

When a malfunction is caused in a plant, a conventional plant operation support system for diagnosing a malfunction in a plant first reasons a cause for the malfunction (e.g., a phenomenon 1) based on a fault tree representing a correlation among a plurality of phenomenons as shown in FIG. 1 by using process data available at this time. Then, after a final cause of the malfunction, i.e., either one of terminal phenomenons 5 to 9 on the fault tree associated with the phenomenon 1 is detected, the malfunction cause and an operation guidance for curing the malfunction cause are displayed as a result of the diagnosis on the screen of a display unit.

However, even though a malfunction is caused in the plant and a diagnosis for finding a cause of the malfunction, the final cause (a terminal phenomenon on the fault tree) cannot necessarily be identified at all times. In case that the final cause fails to be identified, nothing is displayed as a malfunction cause on the screen of the display unit. In other words, no operation guidance is displayed so as to obviate the malfunction cause.

SUMMARY OF THE INVENTION

An object of the present invention is to provide a plant operation support system which assures that a certain operation guidance can be displayed based on the information obtained from a diagnosing process so as to deal with a malfunction even in case a final cause that is a terminal phenomenon on a fault tree cannot be identified in the diagnosis of the malfunction.

Another object of the present invention is to provide a plant operation support system which assures that appearance of each phenomenon on the fault tree is determined. Phenomenon appearance routes (chain of phenomenon lines) are then identified based on the result obtained from the determination, and thereafter, terminal phenomenons on the phenomenon appearance route are displayed as a malfunction cause.

A further object of the present invention is to provide a plant operation support system which assures that a malfunction can be diagnosed with higher reliability by employing a new method which considers reliability of appearance of each phenomenon subordinate to the phenomenon, and a mutual relationship between the adjacent phenomenons for the determination of the phenomenon.

To accomplish the above-mentioned objects, the present invention provides a plant operation support system wherein a malfunction is diagnosed, based on a fault tree and a diagnosis logic previously stored in a knowledge base. The system uses process data inputted from a plant whether or not each phenomenon on the fault tree appears. The information obtained from the diagnosing process is then displayed, and subsequently, guidance messages are taken out of a guidance data base, based on the foregoing information so as to allow them to be displayed.

According to the present invention, a course or a route representing an occurrence of a malfunction can be clarified, and moreover, appropriate operation guidances can be displayed corresponding to the present state of the diagnosing process. In such manner, since an elaborate information can be given to an operator, each plant operation can be supported with high reliability.

Other objects and features of the present invention will become apparent from reading of the following description which has been made in conjunction with the accompanying drawings.

BRIEF DESCRIPTION OF THE DRAWINGS

FIG. 6 is a diagram which illustrates by way of example the structure of a guidance data base.

FIG. 8 is a diagram which illustrates by way of example the structure of a diagnosis data file employable for practicing the embodiment shown in FIG. 7.

FIG. 10 is a diagram which illustrates by way of example an operation guidance in case that the plant operation support system in accordance with the embodiment shown in FIG. 7 is applied to a thermal power plant.

DESCRIPTION OF THE PREFERRED EMBODIMENT

Figure 2:
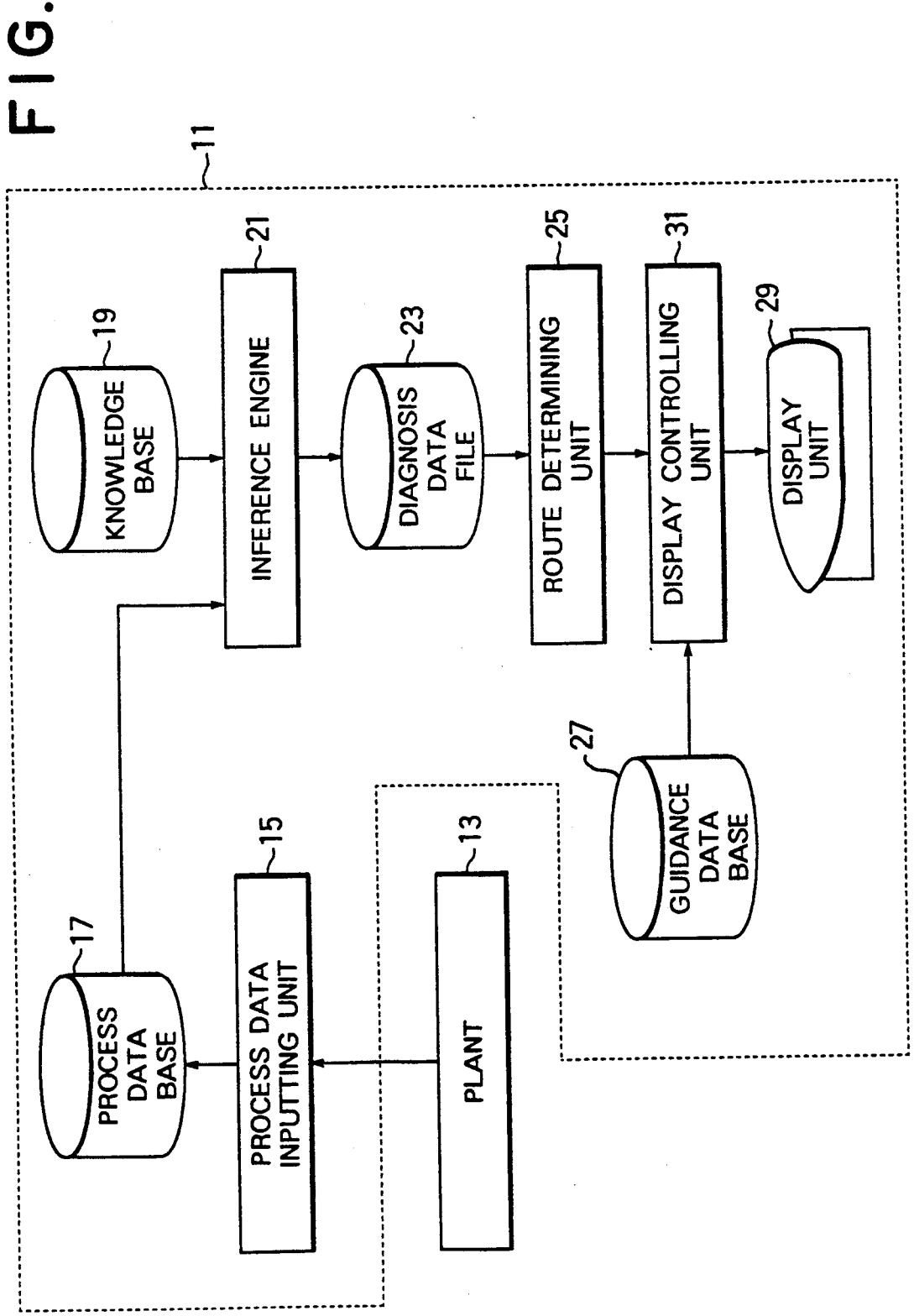
FIG. 2 is a block diagram which illustrates the structure of a plant operation support system in accordance with an embodiment of the present invention.

FIG. 2 shows the structure of a plant operation support system in accordance with an embodiment of the present invention. This plant operation support system (hereinafter referred to simply as a support system) 11 consists of means (as embodied herein, a process data inputting unit 15) for inputting process data from a plant 13, a data from a plant 13, a for inputting process data from a plant 13, a process data base 17 in which the process data inputted into the process data inputting means 15 are reserved, a knowledge base 19, an inference engine 21 for diagnosing malfunctions of the plant, a diagnosis data file 23 in which the diagnosis data outputted from the inference engine 21 are stored, route determining means (as embodied herein, a route determining unit 25) for determining a phenomenon appearance route associated with an occurrence of malfunction with which the support system starts a diagnosing operation by using the diagnosis data reserved in the diagnosis data file 23, a guidance data base 27 in which guidance messages are previously registered corresponding to each phenomenon, and display controlling means (as embodied herein, a display controlling unit 31) for displaying on the screen of a display unit 29 not only the determined phenomenon appearance route but also the guidance message retrieved from the guidance data base 27 based on the determined phenomenon appearance passage.

Figure 1:
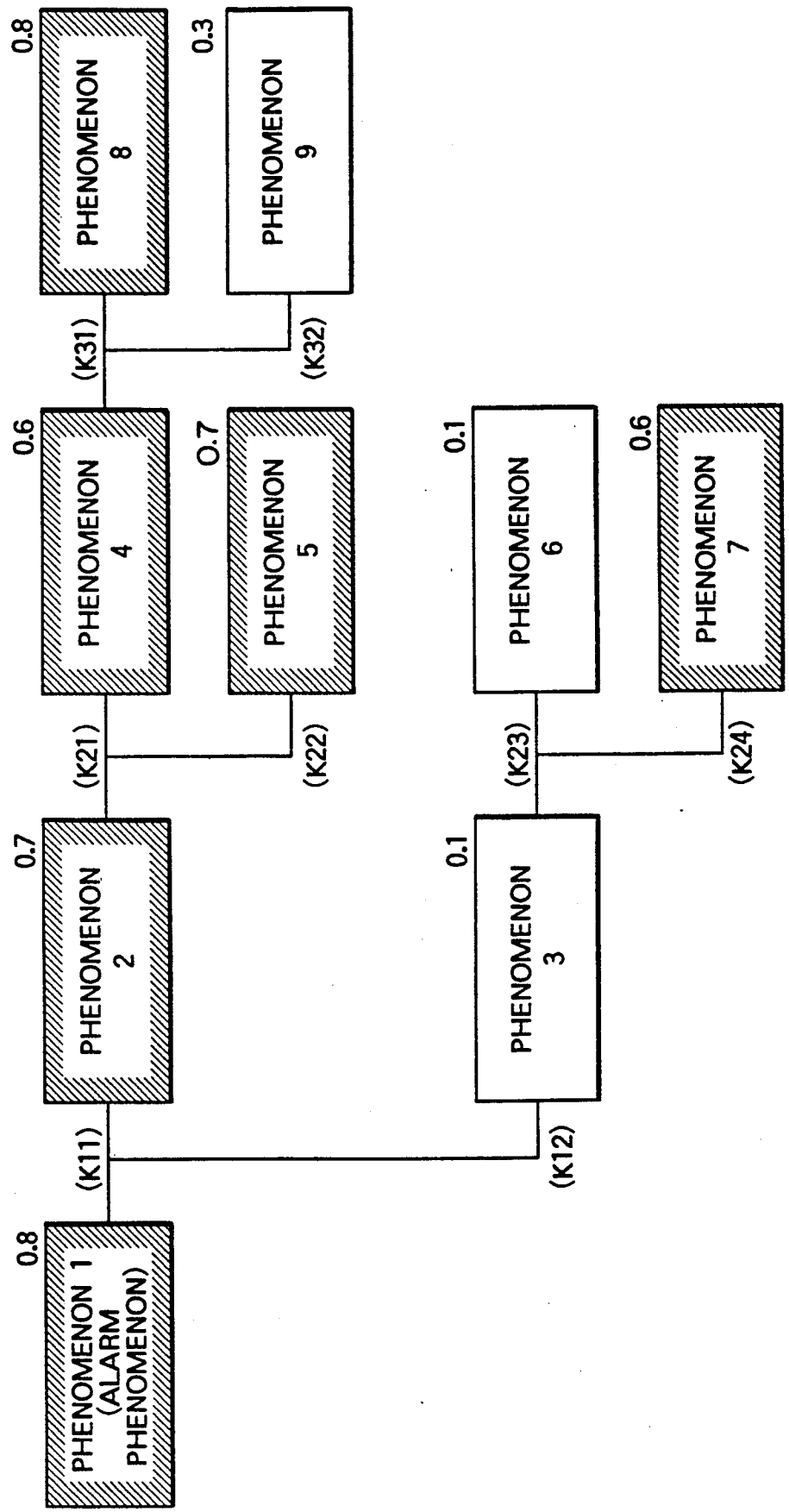
FIG. 1 is a block diagram which illustrates by way of example a fault tree.

For example, the diagnosis knowledge having the information of the fault tree as shown in FIG. 1 is stored in the knowledge base 19. Referring to FIG. 1 which shows the fault tree again, a phenomenon 1 represents a malfunction with which the support system starts a diagnosis, e.g., a phenomenon which causes an alarm in the plant. Each of a phenomenon 5, a phenomenon 6, a phenomenon 7, a phenomenon 8 and a phenomenon 9 is considered to be a final cause responsible for the phenomenon 1. Next, each of a phenomenon 2, a phenomenon 3 and a phenomenon 4 represents a matter or a phenomenon which is located at the intermediate position in the course of a searching operation for each malfunction cause. The phenomenons as mentioned above are arranged with their relation degrees K11 to K32 each of which represents an intensity of the mutual relationship among the phenomenons. Each relation degree is represented by a numeral between 0 to 1. The larger the numeral, the intenser the mutual relationship among the phenomenons.

Figure 3:
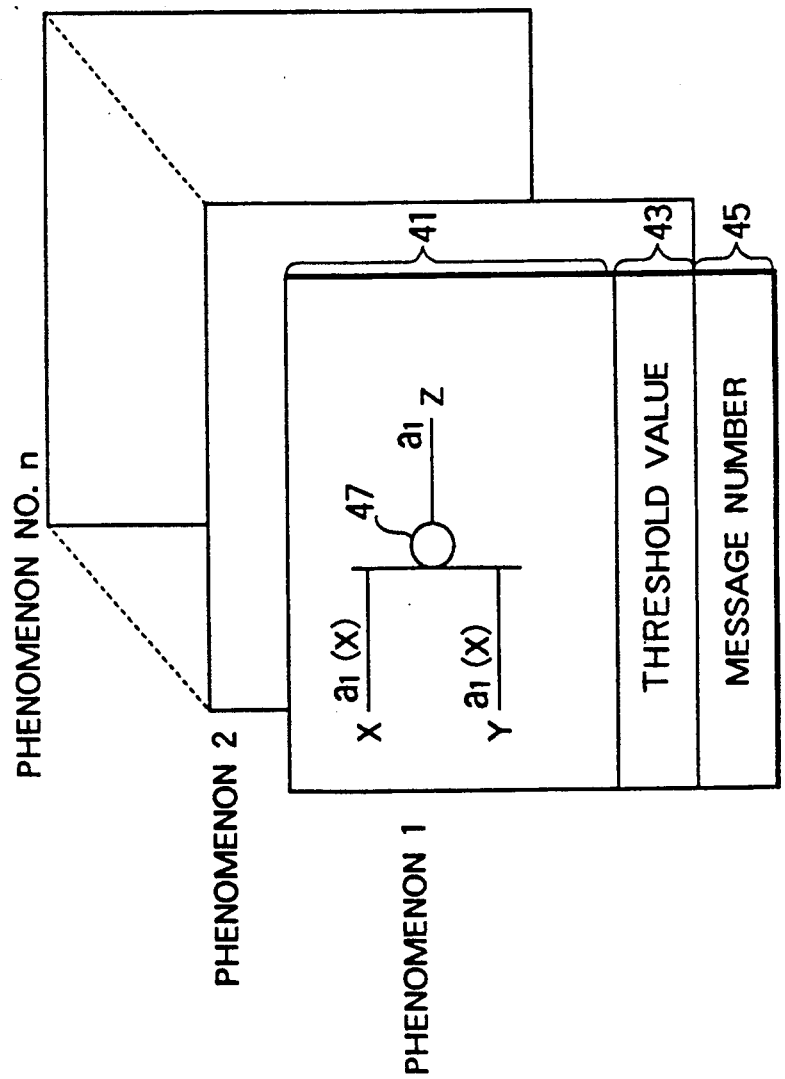
FIG. 3 is a diagrammatical view which illustrates by way of example the structure of phenomenon data stored on a knowledge base.

As shown in FIG. 3, each phenomenon in the knowledge base previously has information as follows; a diagnosis logic 41 for calculating, based on the process data, reliability with which the phenomenon appears (hereinafter referred to as self-establishment degree), a threshold 43 serving as a determination reference for determining whether the each phenomenon practically appears or not, and a number 45 given to a guidance message for instructing a treatment to be taken corresponding to the phenomenon. The guidance message is reserved in the guidance data base 27 for each of the guidance message numbers.

As the inference engine 21 is activated in response to, e.g., an alarm in the plant, it calculates, based on the process data reserved in the process data base 17 and the aforementioned diagnosis knowledge reserved in the knowledge base 19, reliability of appearance of all the phenomenons leading to an alarm phenomenon 1 (hereinafter referred to simply as a phenomenon establishment degree), and then, determines which phenomenon has appeared among the phenomenons by comparing the phenomenon establishment degree with the threshold value. The results obtained from the foregoing diagnosis are stored in the diagnosis data file 23.

The route determining unit 25 identifies the phenomenon appearance routes extending from the precedent phenomenon down to the subordinate phenomenon in accordance with the aforementioned fault tree by using the data stored in the diagnosis data file 23.

The display controlling unit 31 displays on the screen of the display unit 29 the phenomenon appearance routes determined by the route determining means 25 and the terminal phenomenons located on at the terminals of the phenomenon appearance routes as causes for the malfunction (alarm). At the same time, the guidance messages corresponding to the causes for the malfunction are retrieved from the guidance data base 27, and they are then displayed on the screen of the display unit 29.

With such construction, the inference engine 21 is activated in response to an occurrence of a malfunction, e.g., an alarm in the plant 13. The inference engine 21 takes the process data at the time of occurrence of the alarm from the plant 13 out of the process data base 17 and then calculates, based on the fault tree including the alarm phenomenon 1 stored in the knowledge base 19, reliability on appearance of each phenomenon in the fault tree, i.e., a phenomenon establishment degree.

Here, a method of determining a new phenomenon establishment degree will be described below. In this embodiment, a larger one selected from the self-establishment degree and a propagation establishment degree to be described later is taken as a phenomenon establishment degree. The self-establishment degree represents reliability on appearance of a phenomenon which can be calculated based on the plant data in accordance with the diagnosis logic 41 as shown in FIG. 3 which is set for each of the phenomenons. The propagation establishment degree represents reliability on appearance of the precedent phenomenon which can be calculated from the phenomenon establishment degree of the subordinate phenomenon and a relationship degree of the subordinate phenomenon relative to the precedent phenomenon, and moreover, shows a degree of an effect of appearance of the subordinate phenomenon on the precedent phenomenon. Therefore, referring to the fault tree shown in FIG. 1, no propagation establishment degree is present in the phenomenon 5, the phenomenon 6, the phenomenon 7, the phenomenon 8 and the phenomenon 9 at the terminal of the fault tree each of which is a final cause for the malfunction of the plant 13, and the self-establishment degree of the terminal phenomenon is taken as a phenomenon establishment degree.

The self-establishment degree is calculated in accordance with the diagnosis logic 41 as shown in FIG. 3. For example, with reference to the diagnosis logic 41 shown in FIG. 3, a value of Z obtainable by applying an OR relationship 47 to reliability on diagnostic factors X and Y for the first phenomenon 1 (hereinafter referred to as a reliability degree) is taken as a self-establishment degree for the phenomenon 1. Specifically, when the reliability degree of X is designated by a1(X), the reliability degree of Y is designated by a1(Y) and a value of Z, i.e., the self-establishment degree of the phenomenon 1 is designated as a1, a larger value selected from a1(X) and a1(Y) is outputted as a1. In addition, the OR relationship 47 is represented by the following equation for which a calculation for max is used:

$$a1 = max\ (a1(X), a1(Y))$$

The reliability degree of X and the reliability degree of Y show a degree of the abnormality derived from the process data corresponding to each of X and Y. Usually, they are represented by a numeral between 0 to 1. The larger the numeral, the higher the abnormal degree.

The propagation establishment degree is calculated based on the phenomenon establishment degree of the subordinate phenomenon and the relation degree between the subordinate phenomenon and the precedent phenomenon. For example, a maximum value selected from values obtained by multiplying the relationship degree by the phenomenon establishment degree of each of the subordinate phenomenons depending from a same phenomenon is taken as a propagation degree of the precedent phenomenon. When the phenomenon 1 shown on the fault tree of FIG. 1 is taken as an example, a propagation establishment degree a2 of the phenomenon 1 is calculated in accordance with the following equation in which the phenomenon establishment degrees of the phenomenon 1 and the phenomenon 2 are designated by cf2 and cf3 and the relationship degree of the subordinate phenomenon 2 relative to the phenomenon 1 and the relationship degree of the phenomenon 3 are designated by K11 and K12:

$$a2 = max(K11 \times cf2, K12 \times cf3)$$

In such manner, two establishment degrees, i.e., a self-establishment degree and a propagation establishment degree are present with each phenomenon exclusive of the terminal phenomenons. A larger value selected from the self-establishment degree and the propagation establishment degree is employed for representing final reliability on a final phenomenon, i.e., a phenomenon establishment degree. For example, when the phenomenon establishment degree of the phenomenon 1 is designated by cf1, the phenomenon establishment degree cf1 is given based on the self-establishment degree a1 and the propagation establishment degree a2 in accordance with the following equation:

$$Cf1 = max(a1, a2)$$

In this embodiment, since the phenomenon establishment degree is determined in consideration not only of the self-establishment degree obtainable from the process data but also of the propagation establishment degree obtainable from the establishment degree of the respective subordinate phenomenons, the phenomenon establishment degree can be obtained with higher reliability.

Figure 4:
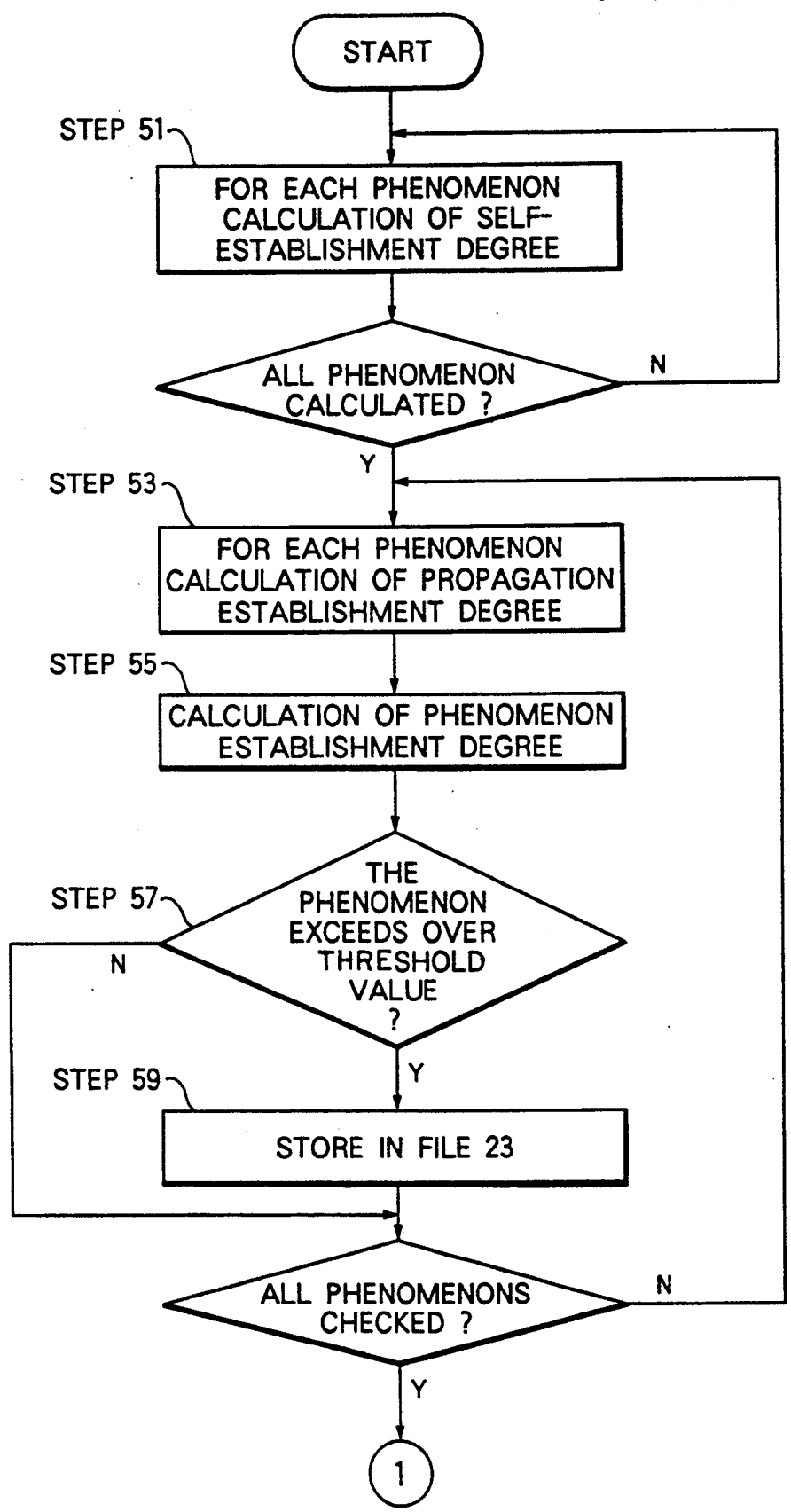
FIG. 4 is a flowchart which explanatively illustrates a procedure of malfunction diagnosises to be conducted by an inference engine in accordance with an embodiment of the present invention.
Figure 5:
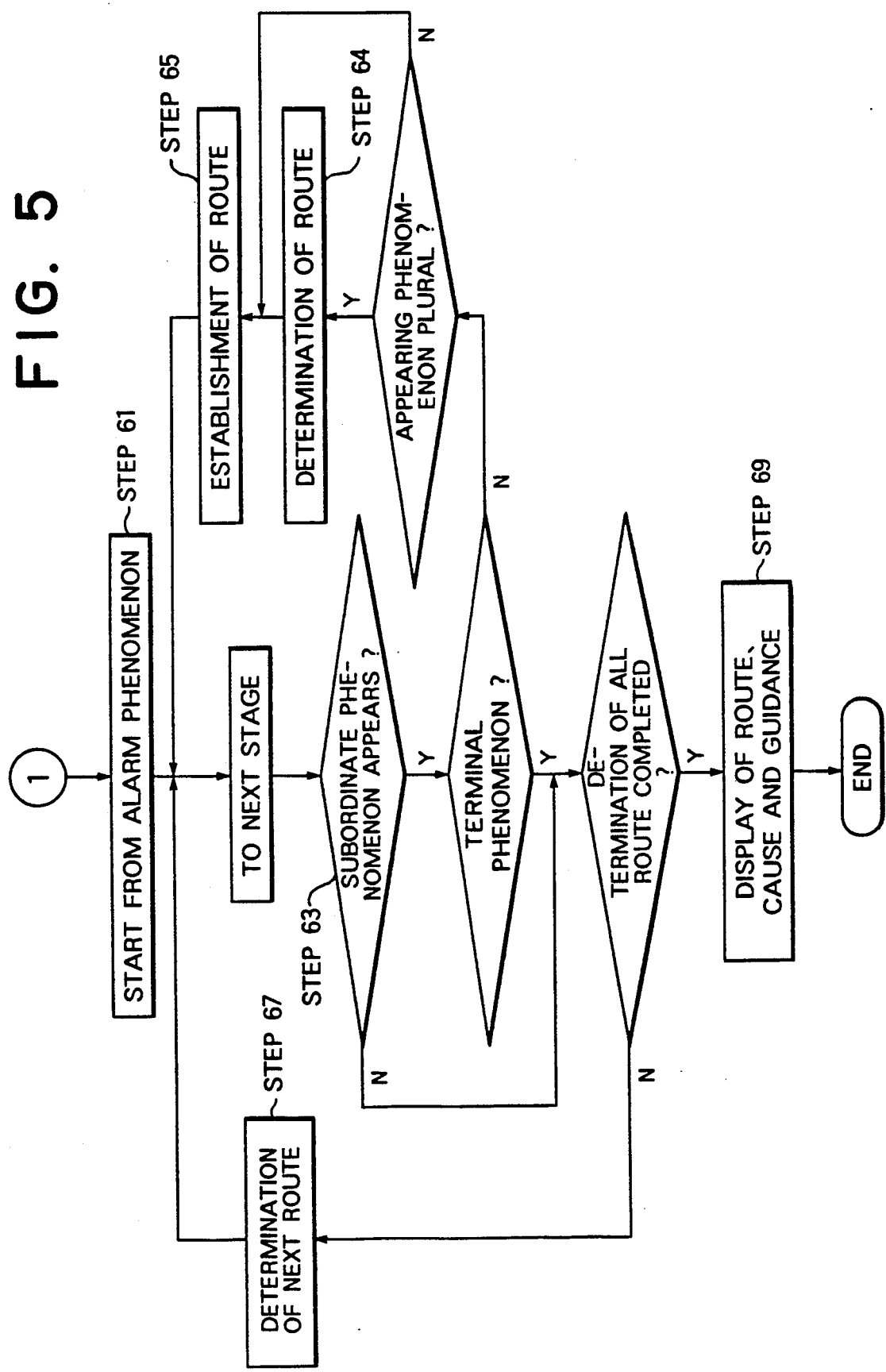
FIG. 5 is a flowchart which explanatively illustrates operations to be performed by phenomenon appearance route determining means and display controlling means in accordance with the present invention.

FIG. 4 and FIG. 5 are a flowchart which illustrates an operation to be performed after the support system 11 starts to diagnose a malfunction of the plant 13. As shown in FIG. 4, when the inference engine 21 is activated in response to occurrence of, e.g., an alarm, the self-establishment degree of each phenomenon is calculated in accordance with a preset diagnosis order with reference to the process data in the process data base 17 and the fault tree of the phenomenon (step 51). After completion of the calculating operation for the self-establishment degrees of all the phenomenons, the propagation establishment degree of the precedent phenomenon is calculated from the terminal phenomenon side based on the self-establishment degree usable as a phenomenon establishment degree and the relationship degree relative to the precedent phenomenon (step 53), and then, a larger one selected from the previously obtained self-establishment degree and the propagation establishment degree is taken as a phenomenon establishment degree of the precedent phenomenon by comparing the self-establishment degree and the propagation establishment degree (step 55). Subsequently, the phenomenon establishment degree is compared with the threshold 43 which has been preset for each phenomenon as shown in FIG. 3 (step 57), and when the phenomenon establishment degree is larger than the threshold 43, it is determined that the phenomenon is established, i.e., the phenomenon appears. The phenomenon which is determined to be established is successively reserved in the diagnosis data file 23 (step 59).

In such manner, the inference engine 21 determines via calculation of the phenomenon establishment degree for each phenomenon whether the phenomenon is established or not. With respect to the phenomenon which is established, a name of the phenomenon and a message ID number of the same are stored in the diagnosis data file 23 together with the phenomenon establishment degree and the relationship relative to the precedent phenomenon for determining association of the established phenomenons. When a diagnosis for all the phenomenons is completed or when the diagnosing operation is interrupted half-way, e.g., a NULL code is transmitted to the diagnosis data file 23 in which in turn it is stored, in order to inform completion of the diagnosing operation.

When the NULL code is transmitted in that way, the route determining unit 25 determines in accordance with the fault tree with reference to the diagnosis file 23 the route in which the phenomenons appear. This determination is made in accordance with a procedure as shown in FIG. 5. First, the program starts from an alarm phenomenon (step 61), searches for the phenomenon wherein the phenomenon establishment degree exceeds the threshold value while successively going down to the subordinate phenomenons (step 63), and subsequently, obtains a phenomenon appearance route by following the appearing phenomenons (step 65). The route searching operation is terminated at the phenomenon wherein any subordinate phenomenon does not have a phenomenon establishment degree in excess of the threshold value. At this time, the range extending from the alarm phenomenon down to the searching operation completion phenomenon is taken as a phenomenon appearance route.

Incidentally, in case that a plurality of phenomenon appearance routes are present in the fault tree, e.g., in case that a plurality of phenomenons each having a phenomenon establishment degree in excess of the threshold value are present in the subordinate phenomenons, determination is made at a step 64 by calculating which route has priority. A larger one selected from results obtained by multiplying the phenomenon establishment degree by the relationship degree at each stage (which represents a lateral depth on a fault tree, for example, phenomenon 1 is stage 0, and phenomenon 2 and phenomenon 3 are stage 1 in FIG. 1) is employed with priority to obtain a phenomenon appearance route (step 65). After the searching operation for a first phenomenon appearance route is completed in the above-described manner, a larger one selected from results obtained by multiplying the phenomenon establishment degree by the relationship degree is employed to obtain a second phenomenon appearance route (step 67). Then, the first phenomenon appearance route, the second phenomenon appearance route—NO. n phenomenon appearance route are successively ranked in accordance with the order for searching for each phenomenon appearance route.

When all the routes are determined by the passage determining unit 25, the program goes to a step 69 at which the respective phenomenon appearance routes are displayed by the display controlling unit 31 as they are ranked. The respective terminal phenomenons are displayed on the screen of the display unit 29 as causes. At the same time, the display controlling means 31 gets the guidance messages corresponding to the message ID numbers of the phenomenons identified as the causes from the guidance data base 27, and the guidance messages are displayed together with the causes on the screen of the display unit 29. The guidance data base 27 is constructed as shown in, e.g., FIG. 6.

Next, a method of determining each phenomenon appearance route with the aid of the route determining unit 25 will be described in detail below with reference to the fault tree shown in FIG. 1 as an example. Referring to FIG. 1, a numeral placed at a right upper corner of each phenomenon designates a phenomenon establishment degree, and each phenomenon identified by hatched lines represents a phenomenon of which phenomenon establishment degree exceeds in excess of the threshold value. The following five routes are present in the fault tree.

(1) alarm phenomenon 1 - phenomenon 2 - phenomenon 4 -phenomenon 8

(2) alarm phenomenon 1 - phenomenon 2 - phenomenon 4 -phenomenon 9 (3) alarm phenomenon 1 - phenomenon 2 - phenomenon 5

(4) alarm phenomenon 1 - phenomenon 3 - phenomenon 6

(5) alarm phenomenon 1 - phenomenon 3 - phenomenon 7

As a first step, the phenomenons depending from the alarm phenomenon comprise the phenomenon 2 and the phenomenon 3. Therefore, the phenomenon 2 having a phenomenon establishment degree in excess of the threshold is employed.

In addition, as a second step, the phenomenons depending from the phenomenon 2 comprise the phenomenon 4 and the phenomenon 5, and a phenomenon establishment degrees of each of the phenomenon 4 and the phenomenon 5 exceeds the threshold value. Therefore, the following calculation is performed as a second step. Here, it is assumed that a relationship degree K21 between the phenomenon 2 and the phenomenon 4 is 0.8 and a relationship degree K22 between the phenomenon 2 and the phenomenon 5 is also 0.8.

extent of the influence caused by the phenomenon 4 = relationship degree × phenomenon establishment degree of the phenomenon 4 = 0.8 × 0.6 = 0.48
extent of the influence caused by the phenomenon 5 = relationship degree × phenomenon establishment degree of the phenomenon 5 = 0.8 × 0.7 = 0.56

Thus, the phenomenon 5 having a larger extent of the influence is employed based on the results obtained from the above calculations.

As a third step, the phenomenon 5 does not have any phenomenon depending therefrom. Therefore, the first phenomenon appearance passage is represented in the following manner.

alarm phenomenon 1 - phenomenon 2 - phenomenon 5

As a fourth step, the phenomenons depending from the phenomenon 4 comprise the phenomenon 8 and the phenomenon 9. Therefore, the phenomenon 8 having a phenomenon establishment degree in excess of the threshold is employed.

As a fifth step, the phenomenon 8 does not have any phenomenon depending therefrom. Therefore, the second phenomenon appearance passage is represented in the following manner.

alarm phenomenon 1 - phenomenon 2 - phenomenon 4 - phenomenon 8

Therefore, in the example as shown in FIG. 1, the phenomenon 5 and the phenomenon 8 are successively displayed as the causes.

As is apparent from the above description, according to this embodiment, when the route determining means searches for the phenomenon appearance route based on the result obtained from the diagnosis conducted by the inference engine with respect to each phenomenon, the support system makes it possible to make a comprehensive evaluation for the purpose of determining what should be outputted as the final cause of the malfunction. Even in case that the final cause is not identified, the terminal phenomenon of the searched phenomenon appearance route is outputted as the cause so that the support system can provide elaborate informations on the route and the phenomenons on the route determined in accordance with the fault tree shown in FIG. 1. In addition, in case that only the terminal phenomenon is established but an intermediate phenomenon is not established like the phenomenon appearance route as represented by phenomenon 1 - phenomenon 3 - phenomenon 7 shown in FIG. 1, there is a possibility that the support system hitherto determines merely whether the terminal phenomenon is established or not, and moreover, displays the established terminal phenomenon 7 as a cause. In contrast with this, according to the present invention, the support system can eliminate from the cause the case that the intermediate phenomenon is not established. Consequently, the support system can output more exact diagnosing results.

Incidentally, in the aforementioned embodiment, the support system determines using a larger one selected from the self-establishment degree and the propagation establishment degree whether a phenomenon is established or not. For this reason, the support system can perform a diagnosis with high reliability. However, when the aforementioned method is employed, the support system determines starting from the subordinate phenomenon whether a phenomenon is established or not, because it is necessary to calculate the propagation establishment degree. Thus, after all the phenomenons are diagnosed, the results of the diagnosis on all the phenomenons are displayed on the screen of the display unit.

In contrast with this, it of course is possible to determine the phenomenon establishment by using only the self-establishment degree. In this case, since the phenomenon establishment can be determined from the precedent phenomenon on the fault tree, it is possible that the successively established phenomenons are displayed on the screen of the display unit as a diagnosis course.

A plant operation support system in accordance with another embodiment of the present invention to which the aforementioned method is applied will be described below with reference to FIG. 7. In this embodiment, components having the same functions as those in FIG. 2 are represented by same reference numerals. Thus, repeated description will not be required.

Figure 7:
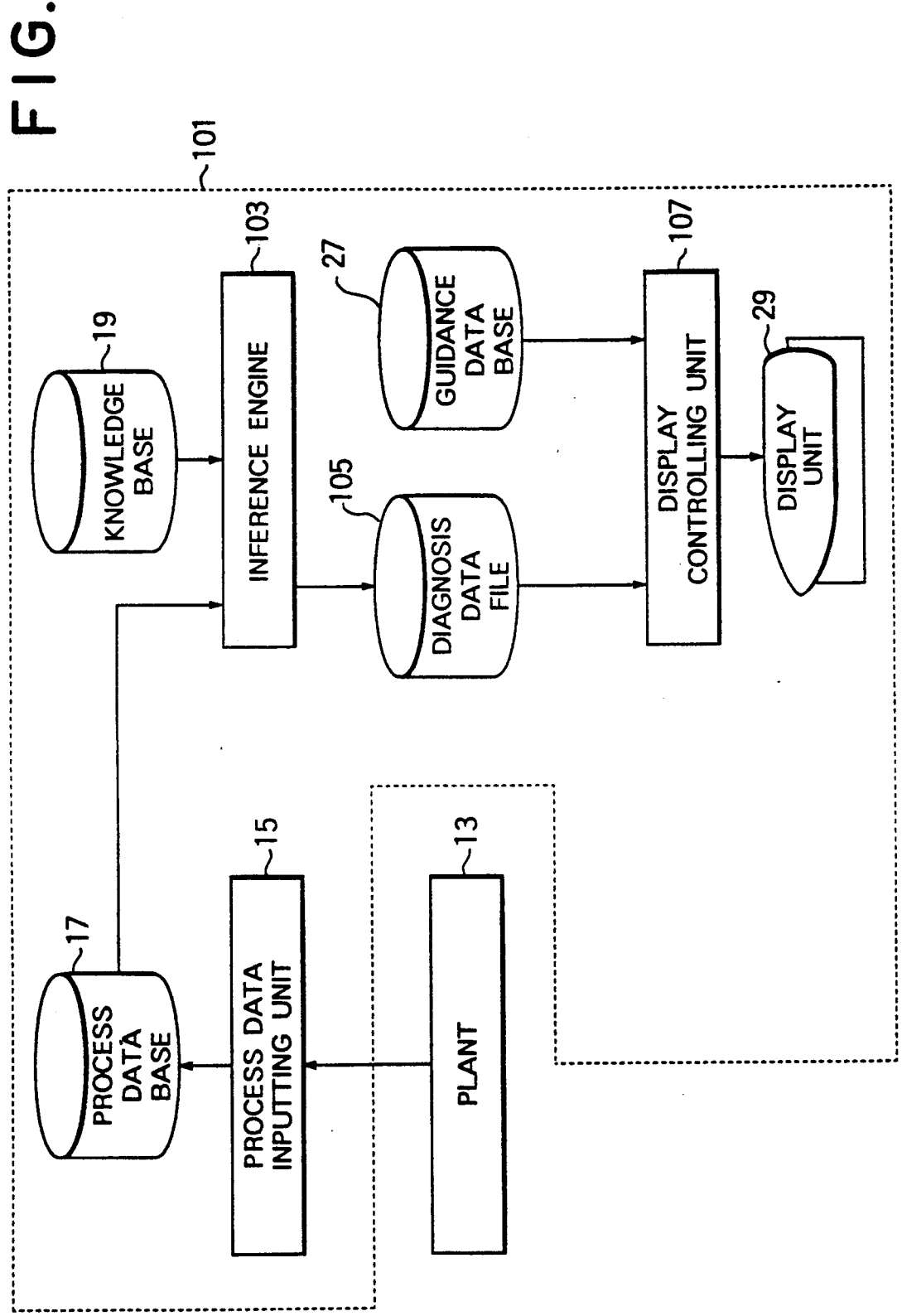
FIG. 7 is a block diagram which illustrates the structure of a plant operation support system in accordance with another embodiment of the present invention.

As shown in FIG. 7, the plant operation support system (hereinafter referred to simply as a guidance system) 101 consists of process data inputting means 15, a process data base 17, a knowledge base 19, an inference engine 103 for conducting a diagnosis with reference to the data base 15 and the knowledge base 19, a diagnosis data file 105 in which diagnosis data inclusive of a course of the diagnosis conducted by the inference engine 103 are reserved, a guidance data base 27, and display controlling means (as embodied herein, a display controlling unit 107) for displaying guidance messages on the screen of a display unit 29 with reference to a diagnosis data file 105 and the guidance data base 27.

In this embodiment, the inference engine 103 conducts a diagnosis in accordance with the order of a phenomenon 1, a phenomenon 2, a phenomenon 4—with reference to the process data base 17 and the knowledge base 19 having the fault tree as shown in FIG. 1. The inference engine 103 determines based on a determination logic and a threshold value in each phenomenon whether the phenomenon, i.e., the abnormality is established or not. In addition, the inference engine 103 calculates a self-establishment degree based on the determination logic for each phenomenon, and then, determines that a phenomenon is established when the self-establishment degree is larger than the threshold value. Names of the established phenomenons and message ID numbers of the same are successively reserved in the diagnosis data file 105. In case that all the phenomenons are diagnosed or the diagnosing operation is interrupted half-way, a NULL code is transmitted to the diagnosis data file 105 and then reserved in order to inform completion of the diagnosing operation. The structure of the diagnosis data file 105 is exemplified in FIG. 8.

On the other hand, the display controlling unit 107 displays an operation guidance on the screen of the display unit 29 with reference to the diagnosis data file 105 stored in that way and the guidance data base 27.

Figure 9:
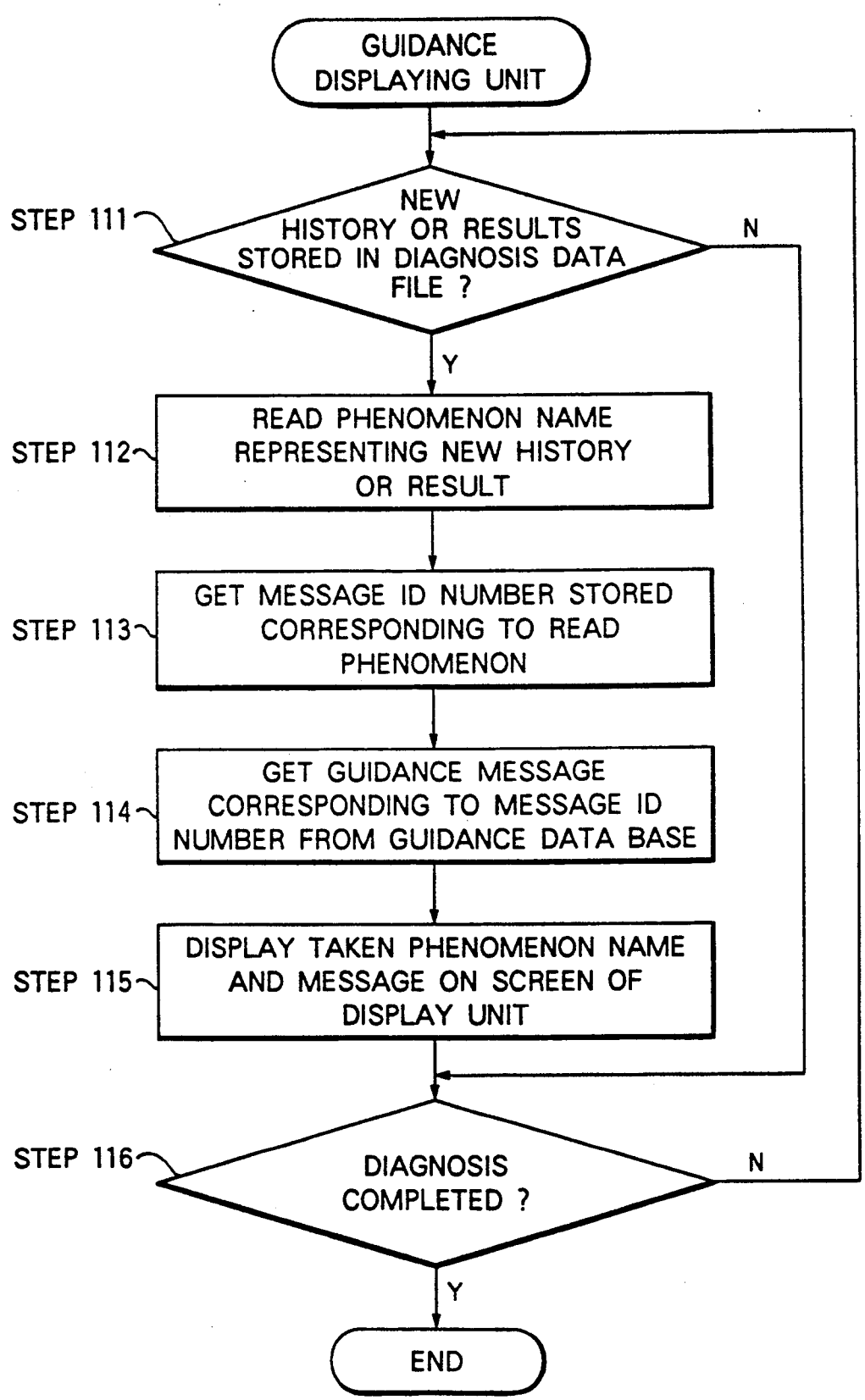
FIG. 9 is a flowchart which explanatively illustrates operations to be performed by the display controlling means in the plant operation support system in accordance with the embodiment FIG. 7.

Operations to be performed by the display controlling unit 107 are shown by steps 111 to 116 in FIG. 9. Referring to the drawing, the display controlling unit 107 makes periodical reference to the diagnosis data file 105 during a diagnosing operation (step 111). In case that a newly reserved phenomenon name and the corresponding message number are present in the diagnosis data file 105, the display controlling unit 107 reads the phenomenon name and the message ID number from the diagnosis data file 105 (step 112 and step 113). In addition, the display controlling unit 107 takes out of the guidance data base 27 the message described with respect to the operation guidance corresponding to the read message number (step 114), and then, displays one set of the phenomenon name and the taken message on the screen of the display unit 29 (step 115). The aforementioned operations are repeatedly performed until the null code is created in the diagnosis data file 105 (step 116). Consequently, as a diagnosing operation proceeds, the display controlling unit 107 can successively display the phenomenon name as a course of the diagnosis and the corresponding operation guidance.

As described above, according to this embodiment, the phenomenon names considered as a course of the diagnosis as well as the operation guidances corresponding to the phenomenon names are successively displayed on the screen of the display unit 29 by the display controlling unit 107 as the diagnosing operation proceeds. Thus, even though the final cause fails to be identified, an elaborate operation guidance can be displayed on the screen of the display unit 29 for each phenomenon determined as abnormality in accordance with the fault tree.

Next, a typical example of case that this embodiment is applied to a diagnosis for a low level of vacuum in a thermal power plant will be described below with reference to FIG. 10.

Referring to the drawing, a fault tree T of vacuum reduction illustrates not only a possibility that phenomenons of cooling water flow rate reduction b and air flow rate increase h appear when a malfunction of vacuum reduction a arises but also a possibility that there are present causes of all CWP stop c, CWP discharge performance getting worse d and condensor outlet valve opening reduction e, provided that the cooling water flow rate reduction b arises as a phenomenon. Similarly, if an air flow rate increase h arises as a phenomenon, the fault tree T illustrates a possibility that there are present causes of vacuum pump abnormality f and vacuum breakage g. For this reason, when these causes are diagnosed, each of the phenomenons is examined starting from the vacuum reduction a in the rightward direction.

Provided that each of these phenomenons is considered as an intermediate phenomenon, the support system can display a conformation message and an operation guide G on the screen of the display unit in such a direction that causes of the intermediate phenomenons are properly corrected. For example, with respect to the malfunction of the vacuum reduction a, a guide G1 is displayed as shown in FIG. 10. In addition, with respect to the phenomenon of the cooling water flow rate reduction b, a guide G2 is displayed. Further, with respect to the final cause of the all CWP stop c, a guide G3 is displayed. For example, in case that a diagnosing operation is terminated by the step of "cooling water flow rate reduction" due to certain disturb, the support system can display the operation guide for the phenomenon "cooling water flow rate reduction" which has reliably occurred even though the final cause can not be identified.

While the present invention has been described above with respect to the preferred embodiments illustrated in the drawings, it should of course be understood that the present invention should not be limited only to these embodiments but various changes or variations may be made without departure from the scope of the invention as defined by the appended claims, and moreover, it should be construed that these changes and variations fall under the coverage of the present invention.

What is claimed is:

1. A plant operation support system for diagnosing a malfunction in a plant and searching for a cause of the malfunction, the system comprising:
   a knowledge base for storing diagnosis knowledge, said diagnosis knowledge including a fault tree representing a correlation among phenomenons appearing in said plant and information for determining whether or not an abnormality arises with respect to each of the phenomenons;
   means for inputting process data from said plant;
   an inference engine for calculating, based on said process data and said knowledge base, reliability of an appearance of at least one particular phenomenon causally related to the malfunction to be diagnosed, and determining whether said at least one particular phenomenon has appeared based on the calculated reliability; and means for controlling a display unit to display an appeared phenomenon corresponding to said at least one particular phenomenon of which appearance has been determined by said inference engine.

2. The plant operation support system according to claim 1, further including a guidance data base for storing a plurality of guidance messages, said guidance messages having operation instructions corresponding to each phenomenon, wherein said display controlling means retrieves a particular guidance message corresponding to the appeared phenomenon, and displays the particular guidance message on the display unit.

3. The plant operation support system according to claim 1, further including means for determining a phenomenon appearance route based on the appeared phenomenon and on said fault tree, wherein said display controlling means displays a terminal phenomenon on said determined phenomenon appearance route as a cause of the malfunction.

4. The plant operation support system according to claim 3, wherein the route determining means determines route priority among a plurality of subordinate phenomenons which depend on the appeared phenomenon, the route determining means determining the route priority by calculating a product by multiplying a reliability of appearance of each of the subordinate phenomenons by an intensity value, and selecting the subordinate phenomenon having a largest product.

5. The plant operation support system according to claim 3, further including a guidance data base for storing a plurality of guidance messages, said guidance messages having operation instructions corresponding to each phenomenon, wherein said display controlling means retrieves a particular guidance message corresponding to the terminal phenomenon, and displays the particular guidance message on the display unit.

6. The plant operation support system according to claim 3, wherein said display controlling means displays the phenomenon appearance route on a screen of the display unit.

7. The plant operation support system according to claim 1, wherein the inference engine determines an establishment degree for the at least one particular phenomenon by:
comparing values of a self-establishment degree and a propagation establishment degree to determine which is larger, the self-establishment degree being based on said process data, the propagation establishment degree being determined by multiplying a phenomenon establishment degree of a subordinate phenomenon by an intensity value; and
setting a value of the establishment degree for the at least one particular phenomenon equal to the larger value.

8. A plant operation support system for diagnosing a malfunction in a plant and searching for a cause of the malfunction, the system comprising:
a knowledge base for storing diagnosis knowledge, said diagnosis knowledge including a fault tree representing a correlation among phenomenons appearing in said plant and information for determining whether or not an abnormality arises with respect to each of the phenomenons;
means for inputting process data from said plant;
an inference engine for determining, based on said process data and said knowledge base whether or not each of the phenomenons having a causal relationship relative to said malfunction has appeared;
a guidance data base for storing a plurality of guidance messages, each of said guidance messages having operation instructions corresponding to each phenomenon; and
means for retrieving a particular guidance message corresponding to an appeared phenomenon corresponding to the at least one particular phenomenon of which appearance has been determined by said inference engine, and controlling a display unit to display said particular guidance message together with the appeared phenomenon.

9. The plant operation support system according to claim 8, wherein said inference engine successively determines whether or not phenomenons appear in order starting from said malfunction and progressing through subordinate phenomenons.

10. The plant operation support system according to claim 9, wherein said display controlling means retrieves said particular guidance message corresponding to a lowermost subordinate phenomenon, and controls the display unit to display said particular guidance message on a screen of said display unit.

11. The plant operation support system according to claim 9, wherein said display controlling means controls the display unit to successively display each of the appeared phenomenons on a screen of said display unit.

12. The plant operation support system according to claim 11, wherein said display controlling means retrieves said particular guidance message corresponding to each of the appeared phenomenons, and controls the display unit to display said particular guidance message.

* * * * *